US012439446B2

(12) United States Patent
Kwon

(10) Patent No.: US 12,439,446 B2
(45) Date of Patent: Oct. 7, 2025

(54) WIRELESS TRANSMISSION SCHEDULING METHOD AND APPARATUS BASED ON UNRELIABLE NETWORK

(71) Applicant: Korea Electronics Technology Institute, Seongnam-si (KR)

(72) Inventor: Tai Gil Kwon, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 224 days.

(21) Appl. No.: 18/085,349

(22) Filed: Dec. 20, 2022

(65) Prior Publication Data

US 2023/0199830 A1   Jun. 22, 2023

(30) Foreign Application Priority Data

Dec. 21, 2021   (KR) .................... 10-2021-0184332

(51) Int. Cl.
*H04W 74/04*   (2009.01)
*H04W 74/08*   (2024.01)
*H04W 80/06*   (2009.01)

(52) U.S. Cl.
CPC ....... *H04W 74/04* (2013.01); *H04W 74/0866* (2013.01); *H04W 80/06* (2013.01)

(58) Field of Classification Search
CPC . H04W 74/04; H04W 74/0866; H04W 80/06; H04W 28/0294; H04L 29/06149; H04L 2012/6448; H04L 12/4035
See application file for complete search history.

(56) References Cited

U.S. PATENT DOCUMENTS

| 2004/0058686 A1* | 3/2004 | Odman | H04L 1/0007 |
| | | | 455/452.2 |
| 2006/0050730 A1* | 3/2006 | Shvodian | H04W 74/02 |
| | | | 370/458 |
| 2006/0099956 A1* | 5/2006 | Harada | H04W 74/02 |
| | | | 455/452.2 |

(Continued)

FOREIGN PATENT DOCUMENTS

WO    WO-2012065578 A1 *  5/2012  ............ H04W 24/10

*Primary Examiner* — Un C Cho
*Assistant Examiner* — Theodore Im
(74) *Attorney, Agent, or Firm* — Knobbe Martens Olson & Bear LLP

(57) ABSTRACT

A wireless transmission scheduling method is proposed. The method may be a synchronous media access control (MAC) wireless transmission scheduling method optimized for a user datagram protocol (UDP) of a personal wireless network-based data transmission system. The method may include setting a superframe period, a beacon period, and a contention period by a master station in a network. The method may also include calculating transmission periods of one or more slave stations participating in the network and a transmission period of the master station. The method may further include transmitting information about the calculated transmission periods of the one or more slave stations to the one or more slave stations participating in the network. The method may further include transmitting data by the one or more slave stations and the master station in the transmission periods assigned to the one or more slave stations and the master station.

8 Claims, 8 Drawing Sheets

(56) References Cited

U.S. PATENT DOCUMENTS

| | | | |
|---|---|---|---|
| 2006/0203795 A1* | 9/2006 | Welborn | H04W 52/367 455/127.1 |
| 2012/0275399 A1* | 11/2012 | Liu | H04W 28/065 370/329 |
| 2012/0320881 A1* | 12/2012 | Hong | H04B 7/2646 370/336 |
| 2015/0063251 A1* | 3/2015 | Asterjadhi | H04W 74/04 370/329 |
| 2015/0071158 A1* | 3/2015 | Fan | H04L 45/026 370/312 |
| 2015/0296397 A1* | 10/2015 | Dural | H04W 24/02 370/252 |
| 2015/0327262 A1* | 11/2015 | Kwon | H04W 72/0446 370/329 |
| 2016/0080115 A1* | 3/2016 | Josiam | H04L 5/0055 370/329 |
| 2016/0113034 A1* | 4/2016 | Seok | H04W 74/04 370/329 |
| 2018/0007561 A1* | 1/2018 | Adachi | H04W 74/002 |
| 2018/0270884 A1* | 9/2018 | Fraser | H04L 41/0803 |
| 2020/0187296 A1* | 6/2020 | Kim | H04W 4/70 |

* cited by examiner

WIRELESS TRANSMISSION SCHEDULING METHOD AND APPARATUS BASED ON UNRELIABLE NETWORK

CROSS-REFERENCE TO RELATED APPLICATION

This application claims priority to and the benefit of Korean Patent Application No. 10-2021-0184332, filed on Dec. 21, 2021, the disclosure of which is incorporated herein by reference in its entirety.

BACKGROUND

The present disclosure relates to an unreliable network-based wireless transmission method, and more particularly, to a wireless transmission scheduling technology optimized for a user datagram protocol (UDP) standard Internet protocol (IP) that does not guarantee reliability for packet transmission in a real-time data (e.g., video data) transmission system but is advantageous in terms of real-time transmission efficiency.

SUMMARY

One aspect is a wireless transmission scheduling method and apparatus optimized for a user datagram protocol (UDP).

Another aspect is a synchronous media access control (MAC) wireless transmission scheduling method optimized for a user datagram protocol (UDP) of a personal wireless network-based data transmission system, the method including setting a superframe period, a beacon period, and a contention period by a master station in a network, calculating transmission periods of one or more slave stations participating in the network and a transmission period of the master station, transmitting information about the calculated transmission periods of the one or more slave stations to the one or more slave stations, and transmitting data by the one or more slave stations participating in the network and the master station in the transmission periods assigned to the one or more slave stations and the master station.

In an embodiment, the method may further include calculating a verification period, determining whether the verification period is equal to the sum of the beacon period, the contention period, and the calculated transmission periods, and transmitting data by the one or more slave stations and the master station in the calculated transmission periods when the verification period is equal to the sum of the beacon period, the contention period, and the calculated transmission periods, and performing setting of a superframe period, a beacon period, and a contention period and calculating of transmission periods of the one or more slave stations and the master station with respect to a subsequent superframe when the verification period is not equal to the sum of the beacon period, the contention period, and the calculated transmission periods.

The calculating of the transmission periods may include checking the number of the one or more slave stations, and calculating transmission periods of the one or more slave stations and the master statin on the basis of the number of the one or more slave stations.

In an embodiment, the calculating of the transmission periods may include calculating transmission periods of the master station and the one or more slave stations by the following equation:

allocation period=superframe period−(beacon period+contention period);

master period=minimum unit size+α; and slave period=(allocation period−master period)/slave count.

Another aspect is a master station of a personal wireless network-based wireless transmission system, the master station for performing the wireless transmission scheduling method described above.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

DETAILED DESCRIPTION

Figure 1:
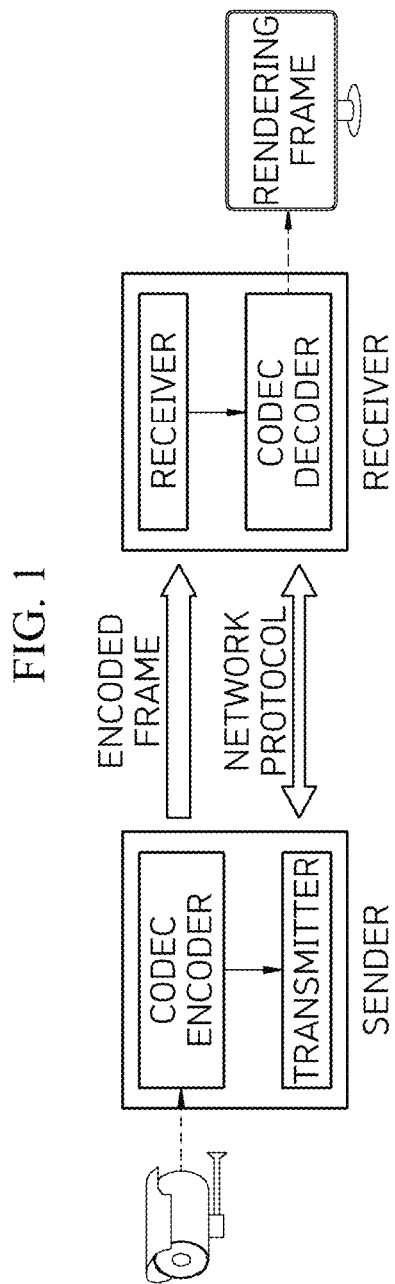
FIG. 1 illustrates a structure of a general real-time video transmission system.

In a real-time video transmission system as shown in FIG. 1, because there is a large amount of video data, the video data is encoded (compressed) into compressed frames using a video codec and the compressed frames are transmitted using a network protocol.

Figure 2:
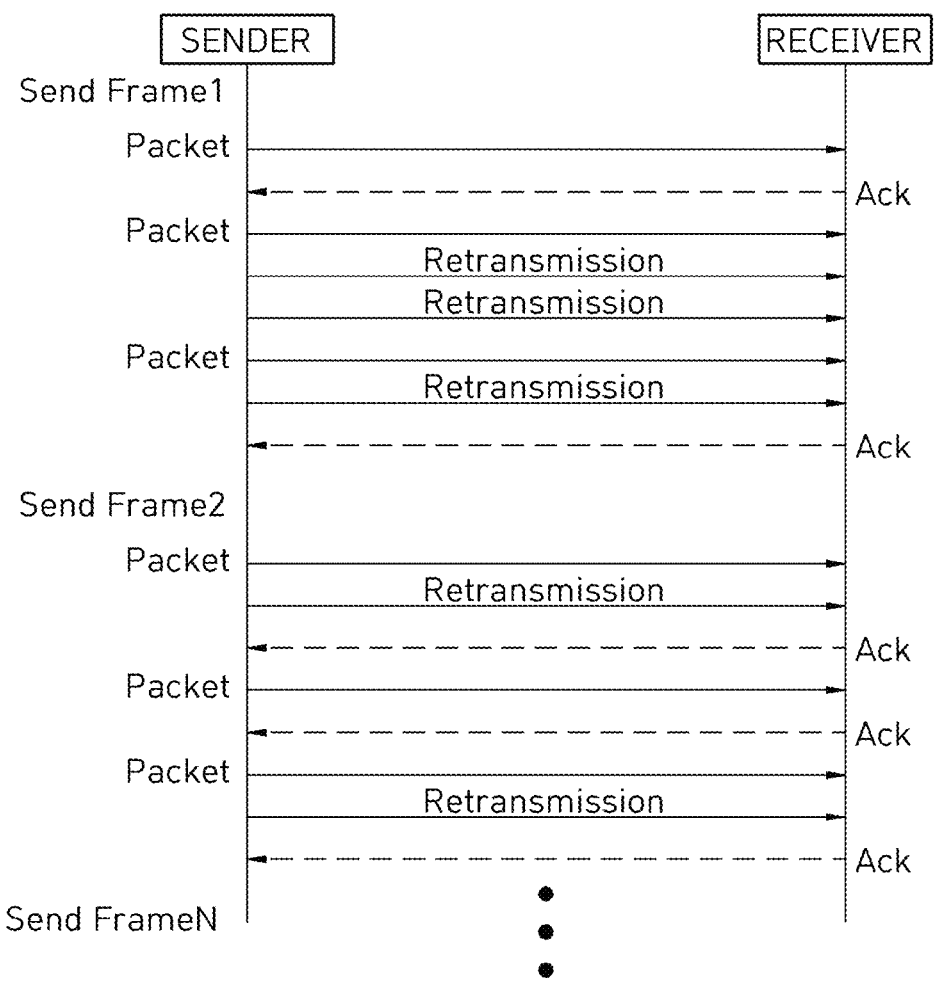
FIG. 2 is a diagram illustrating a transmission control protocol (TCP) transmission mechanism.

In this case, when a transmission control protocol (TCP) network protocol is used, a mechanism of transmitting an acknowledgement ACK by a receiving side to inform whether a packet has arrived successfully or transmitting the packet again to the receiving side by a transmitting side when an acknowledgement ACK is not received within a specific time period operates as shown in FIG. 2. The mechanism operates to guarantee transmission/reception reliability but frequent re-transmission for the acknowledgement ACK and the packet interrupts real-time monitoring at the receiving side over time due to a time delay of video frames.

Figure 3:
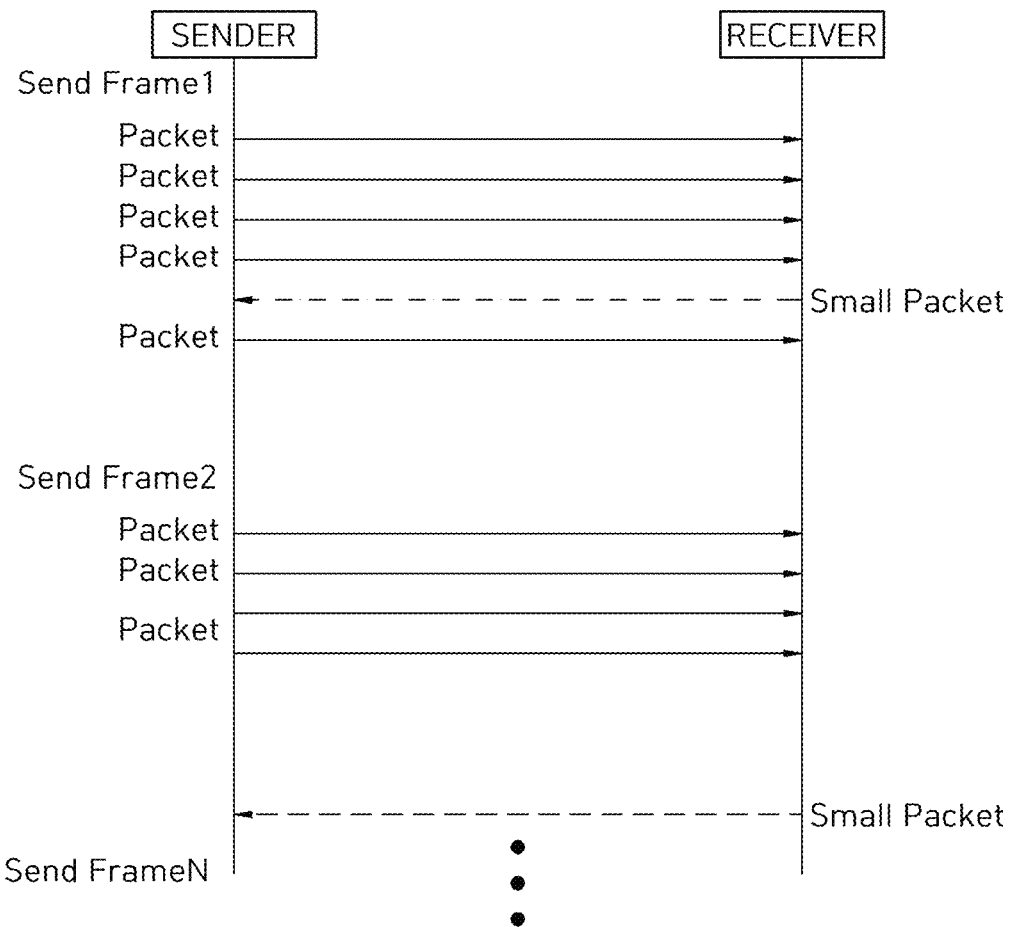
FIG. 3 is a diagram illustrating a user datagram protocol (UPD) transmission mechanism.

To compensate for a time delay in the above-described real-time video transmission system, when encoded (compressed) video frames are transmitted using a user datagram protocol (UDP) network protocol that does not guarantee transmission/reception reliability as shown in FIG. 3, an acknowledgement ACK does not need to be transmitted to the transmitting side by the receiving side to inform whether the packet has been received normally and lost packets do not need to be transmitted again. Therefore, such a UDP protocol transmission mechanism is more suitable for real time video transmission than a TCP protocol transmission mechanism. The UDP transmission mechanism is less advantageous than the TCP protocol transmission mechanism in terms of a packet size or a frequency of packet transmission, although in the UDP transmission mechanism, very small packets may be transmitted from a receiving side to a transmitting side (the UDP is a unidirectional communication scheme but actually, a UPD/IP communication protocol stack of a commercial operating system (OS) such as Linux or Windows is implemented to allow intermittent transmission of small packets from a receiving side to a transmitting side as shown in FIG. 5).

Thus, when a large amount of data, e.g., video data, is transmitted, an unreliable protocol (e.g., the UDP) is more appropriate than a reliable protocol (e.g., a TCP) in terms of efficiency.

Figure 4:
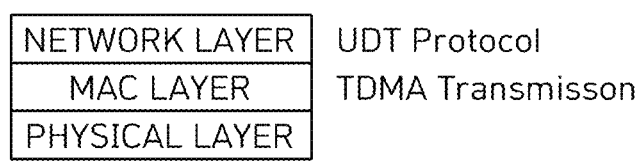
FIG. 4 illustrates a UDP stack installed at each station of a personal wireless communication network according to the present disclosure.

However, in order to achieve optimal transmission efficiency at a network layer using a UDP transmission protocol, an optimal wireless transmission scheduling technique is required for a time division multiple access (TDMA)-based media access control (MAC) layer as shown in FIG. 4 for the reasons described below.

Figure 5:
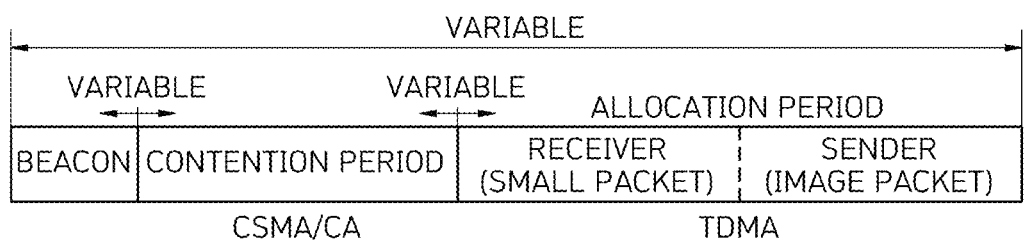
FIG. 5 is a diagram illustrating a structure of a superframe allocated to conventional media access control (MAC) superframe-based wireless transmission scheduling.

In general, data transmission at the TDMA-based MAC layer is performed according to wireless transmission scheduling based on a superframe that includes a beacon period, a contention period, and an allocation period, as shown in FIG. 5. When it is assumed that a total number of transmitting sides and receiving sides is N, an allocation period of a superframe is divided in a 1/N manner as shown in FIG. 5. In a real-time video transmission system, when a transmitting side transmits a UDP packet to a receiving side, the transmitting side transmits data in a sender allocation period of a first superframe, and the receiving side transmits a small packet in a receiver period of a subsequent superframe.

In this case, because both the length of allocation period of a receiver and the length of allocation period of a sender are equal in the 1/N manner, it may be inefficient to consecutively transmit video data from the transmitting side to the receiving side. Because it is intended to transmit video data, which is a large amount of data, as much as possible in a sender period and only a small number of small packets can be transmitted less frequently in a receiver period, an idle period may occur when the sender period and the receiver period are set to be the same or similar.

In addition, in a conventional synchronous scheduling-based MAC wireless transmission method, data is transmitted between a master and slaves by allocating data transmission periods according to the number of slaves in the 1/N manner, but when an Internet protocol (IP)-based UDP is used, transmission efficiency is low because such a wireless transmission scheduling allocation method is not optimized for the UDP transmission mechanism.

Advantages and features of the present disclosure and methods of achieving them will be apparent from embodiments described in detail, in conjunction with the accompanying drawings. However, the present disclosure is not limited to the embodiments set forth herein and may be embodied in many different forms. The embodiments are merely provided so that this disclosure will be thorough and complete and will fully convey the scope of the present disclosure to those of ordinary skill in the art. The present disclosure should be defined by the scope of claims. The terminology used herein is for the purpose of describing embodiments only and is not intended to limit the present disclosure. As used herein, singular forms are intended to include plural forms unless the context clearly indicates otherwise. As used herein, the terms "comprise" and/or "comprising" specify the presence of stated components, steps, operations and/or elements but do not preclude the presence or addition of one or more other components, steps, operations and/or elements.

In the following description of the present disclosure, the related art is not described in detail when it is determined that it would obscure the present disclosure due to unnecessary detail.

Personal Wireless Network

Figure 6:
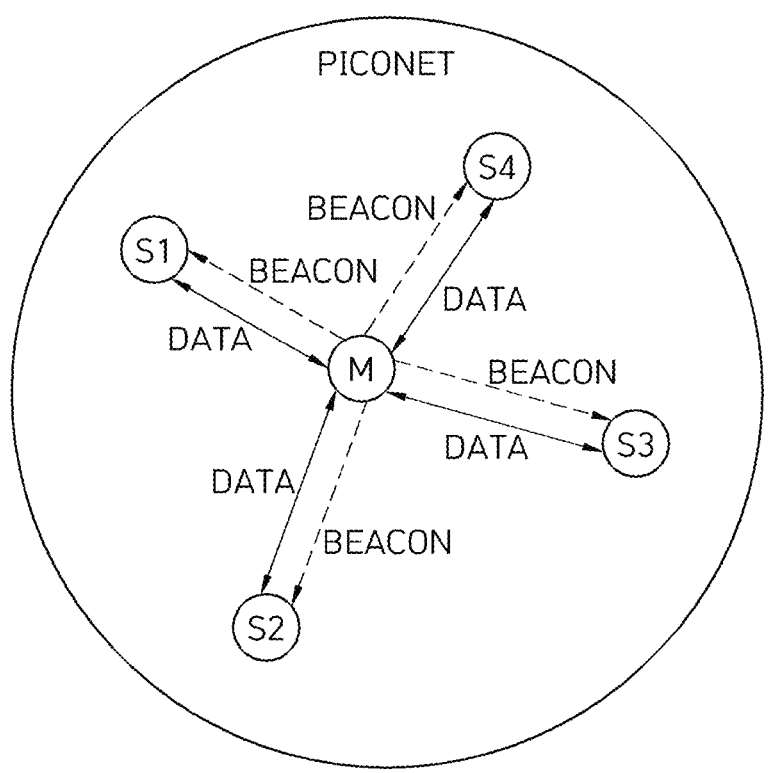
FIG. 6 is a diagram schematically illustrating a network configured by wireless transmission stations according to the present disclosure.

As shown in FIG. 6, a personal wireless network includes stations as most basic elements. For example, a piconet may be formed when there are two or more stations operating at the same radio frequency channel within a personal activity area. The stations are divided into a master and slaves according to roles thereof. The master may manage the entire piconet and there may be only one master in the piconet. The master controls the slaves by broadcasting a beacon. The slaves may transmit/receive data under control of the master.

Personal Wireless Network Transmission

Figure 7:
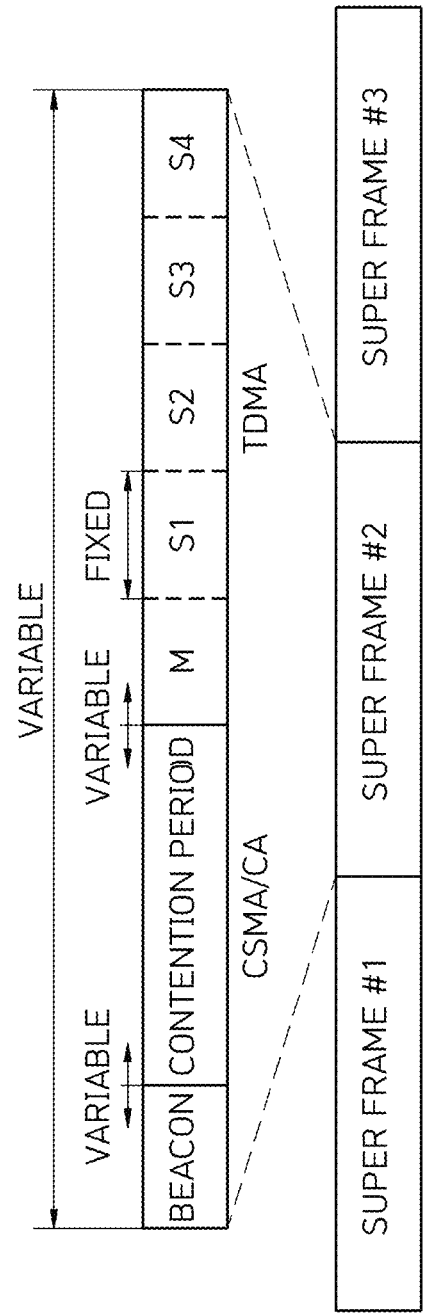
FIG. 7 is a diagram illustrating a structure of a superframe according to the present disclosure.

In FIG. 7, a structure of a superframe, which is a basic unit of wireless transmission scheduling, is largely divided into three parts: a beacon period, a contention period, and an allocation period, and a length of each of these periods is variable.

In the beacon period, a master transmits a beacon packet containing network reference information to slaves in a broadcast manner.

In the contention period, the slave and the masters transmit a command packet, such as a network join request/separation request/permission, a resource allocation request/permission, or a connection request/permission, in a random access method. In the contention period, exclusive access to a medium through exclusive time allocation by the master is not guaranteed and thus each slave should access the medium through contention-type carrier sense multiple access with collision avoidance (CSMA/CA).

In the allocation period, each slave may exclusively access the medium during a time slot allocated thereto. The master distributes time slots of the allocation period to slaves using a time division multiple access (TDMA) scheme. Each slave may exclusively access the medium during the time slot distributed thereto, and in the distributed time slot, each slave may exclusively transmit data without the intervention of the master, and star topology in which one master can communicate with several slaves is supported.

Wireless Transmission Scheduling for Video Transmission System

Hereinafter, specific examples, an overall procedure, and a method of synchronous media access control (MAC) wireless transmission scheduling optimized for a user datagram protocol (UDP) network protocol in a personal wireless network-based video transmission system will be described.

Figure 8:
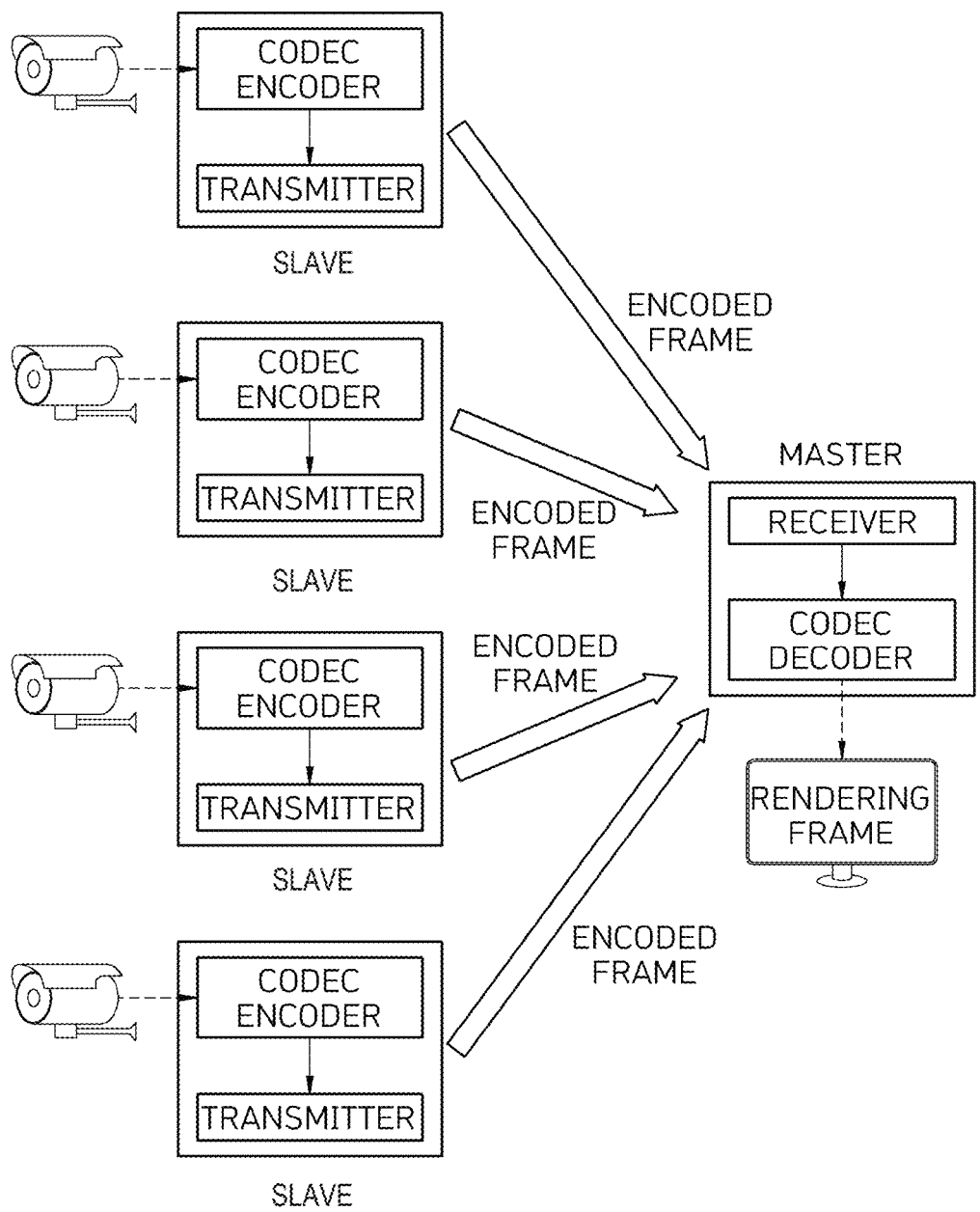
FIG. 8 is a diagram schematically illustrating a personal wireless network-based video transmission system to which the present disclosure is applied.

As shown in FIG. 8, a video transmission system using a personal wireless network is formed as a star-structured network in which data may be transmitted between slaves and a master, which are capable of transmitting videos obtained by a camera, and several slaves transmit video data to the master using an unreliable protocol such as the UDP.

Such a wireless transmission system may include one master and (N−1) slaves when the number of stations is N, but the number of stations capable of participating in a network may be N or less due to transmission system environmental limitations caused by limitations on radio resources for transmission of a large amount of video data.

FIGS. 9 to 12 illustrate examples of wireless transmission scheduling when the number of stations is in a range of 2 to 5 according to embodiments of the present disclosure, in which it is assumed that a default superframe has a size of 20 ms and the sum of a beacon period and a contention period is 3 ms. In these embodiments, a minimum unit of one field in a superframe is set to 1 ms.

Figure 9:
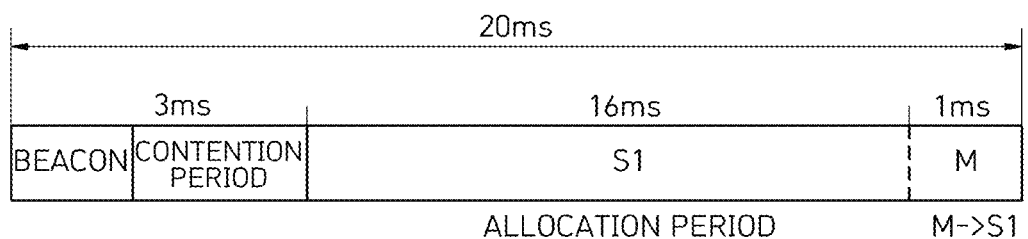
FIGS. 9 to 12 are diagrams illustrating examples of a superframe scheduled according to the present disclosure.

In the embodiment of FIG. 9, in a video transmission system including one video transmitter (slave) and one video receiver (master), an allocation period of the slave and an allocation period of the master are asymmetrically scheduled at a ratio of 16:1 when the number of stations is 2 (N=2). Therefore, the slave is capable of consecutively transmitting video packets at high speed for 16 ms and the master is capable of transmitting a small packet to the slave only for 1 ms, which is a minimum unit of an allocation period, and thus the wireless transmission scheduling of FIG. 9 is suitable for a unidirectional 1:1 video transmission system.

Figure 10:
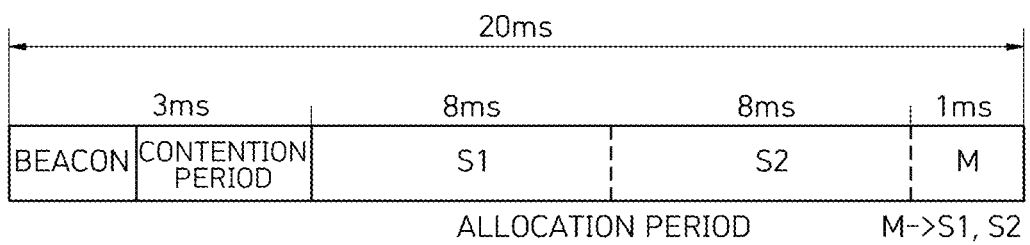

In the embodiment of FIG. 10, in a video transmission system including two video transmitters (first and second slaves) and one video receiver (master), scheduling is performed after setting an allocation period of the master to a minimum unit and allocating a remaining allocation period to the first and second slaves at a ratio of 1/N when the number of stations is 3 (N=3). Therefore, each of the first and second slaves is capable of consecutively transmitting video packets at high speed for 8 ms and the master is capable of transmitting a small packet to the first slave and/or the second slave only for 1 ms, which is a remaining allocation period, and thus the wireless transmission scheduling of FIG. 10 is suitable for a unidirectional 2:1 video transmission system.

Figure 11:
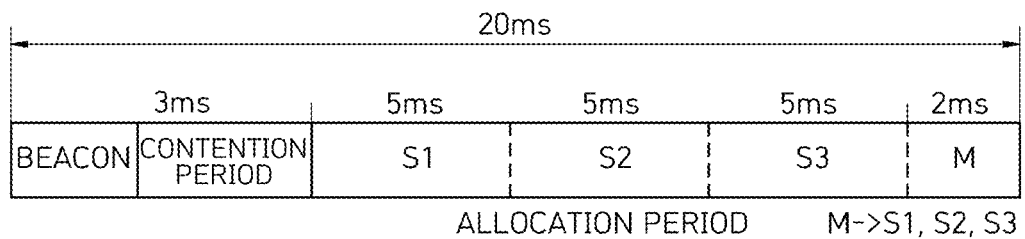

In the embodiment of FIG. 11, in a video transmission system including three video transmitters (first to third slaves) and one video receiver (master), scheduling is performed after setting an allocation period of the master to a minimum unit and allocating a remaining allocation period to the first to third slaves at a ratio of 1/N when the number of stations is 4 (N=4). Therefore, each of the first to third slaves is capable of consecutively transmitting video packets at high speed for 5 ms and the master is capable of transmitting a small packet to the first to third slaves only for 2 ms, which is a remaining allocation period, and thus the wireless transmission scheduling of FIG. 11 is suitable for a unidirectional 3:1 video transmission system.

Figure 12:
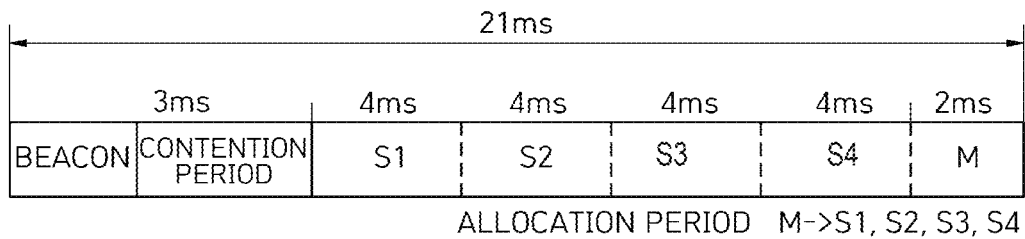

In the embodiment of FIG. 12, in a video transmission system including four video transmitters (first to fourth slaves) and one video receiver (master), scheduling is performed after setting an allocation period of the master to a minimum unit and allocating a remaining allocation period to the first to fourth slaves at a ratio of 1/N when the number of stations is 5 (N=5). Therefore, each of the first to fourth slaves is capable of consecutively transmitting video packets at high speed for 4 ms and the master is capable of transmitting a small packet to the first to fourth slaves only for 2 ms, which is a minimum allocation period, and thus the wireless transmission scheduling of FIG. 12 is suitable for a unidirectional 4:1 video transmission system. FIG. 12 illustrates a case in which although a default superframe has a size of 20 ms, a master period is set to 2 ms and the size of the superframe is adjusted to 21 ms, because the time required for the master to transmit a small packet to the four slaves may exceed 1 ms. In the cases of FIGS. 9 to 11, the size of the superframe is maintained at a default value of 20 ms.

Scheduling methods to be performed on the basis of the number of stations according to embodiments of the present disclosure will be described with reference to FIG. 13 below.

Figure 13:
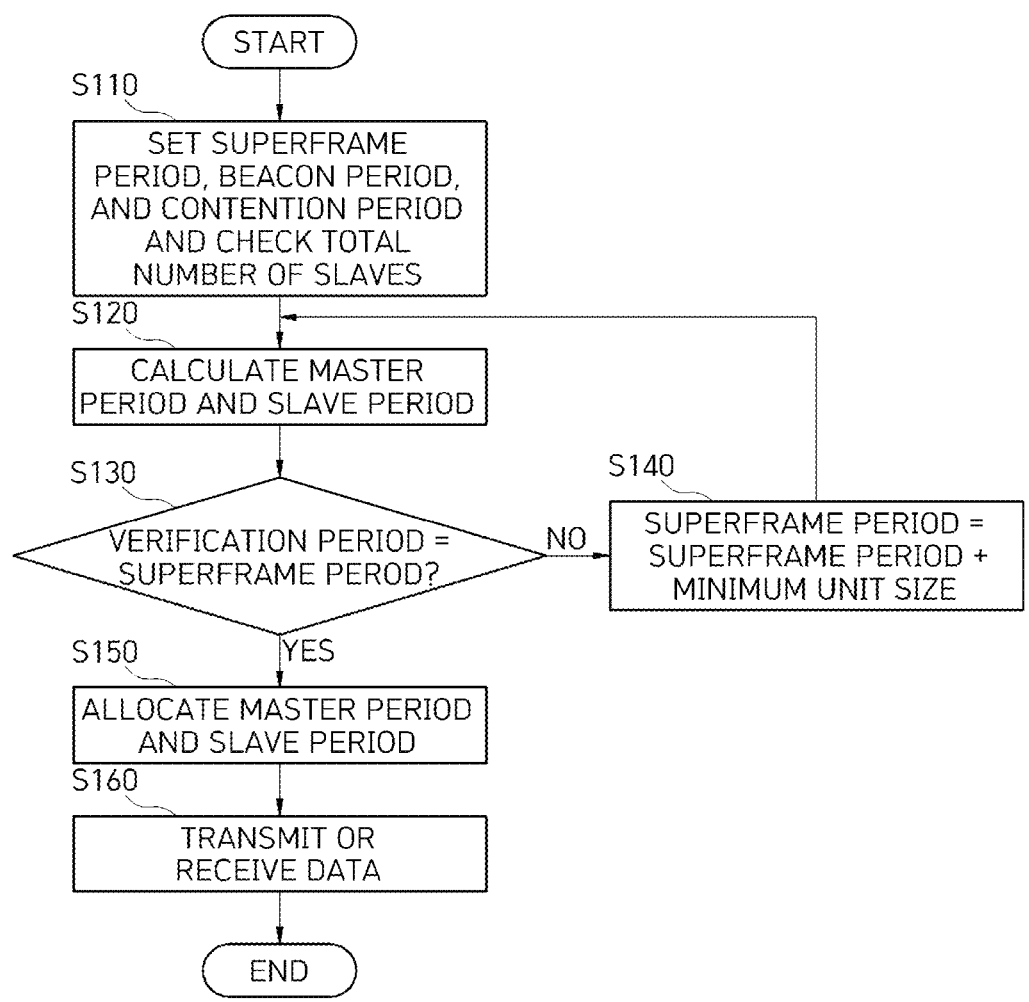
FIG. 13 is a flowchart of a wireless transmission scheduling method according to the present disclosure.

FIG. 13 is a flowchart of a scheduling method in a transmission/reception period of a station according to the present disclosure. Scheduling is performed by a master, and the logic for determining the master among various independent devices in a network may be the same as that used in the related art and thus a detailed description will be omitted here.

A device designated as the master sets a superframe period, a beacon period, and a contention period, and checks the number of slaves participating in the network (S110). The number of slaves may be checked in various ways, for example, by counting the number of slaves that respond to a beacon signal, which is transmitted from the master in the beacon period, in the contention period.

Next, a master period in which the master may transmit data and a slave period in which a slave may transmit data are determined by Equations 1 to 3 below (S120).

$$\text{allocation period} = \text{superframe period} - (\text{beacon period} + \text{contention period}) \quad \text{[Equation 1]}$$

$$\text{master period} = \text{minimum unit size} + \alpha \quad \text{[Equation 2]}$$

$$\text{slave period} = (\text{allocation period} - \text{master period})/\text{slave count} \quad \text{[Equation 3]}$$

In Equation 2, the master period may be set to a size of a minimum unit (e.g., 1 ms)+$\alpha$ in a superframe, and $\alpha$ is set to a value of 0 or more so that the master period may be flexibly changed as the number of slaves increases or decreases. $\alpha$ may be obtained experimentally, and for example, $\alpha$ may be 0 when the number of slaves is 3 or less, may be 1 ms when the number of slaves is in a range of 4 to 6, and may be 2 ms when the number of slaves is 6 or more. For example, in the embodiment of FIG. 12, the master period is calculated to be a minimum size (1 ms)+$\alpha$ (1 ms)=2 ms to transmit a small packet to the four slaves.

After the calculation of the master period and the slave period, a verification period is calculated by Equation 4 below.

$$\text{verification period} = (\text{beacon period} + \text{contention period}) + \text{master period} + (\text{slave period} \times \text{slave count}) \quad \text{[Equation 4]}$$

When the calculated verification period is equal to the superframe period (Y in S130), the calculated master period and slave periods are allocated to the slaves and the master (S150), and the slaves and the master transmit data in the periods allocated thereto (S160). When there is additional data to be transmitted and there is no change in the number of stations in the network, the data is transmitted or received by allocating the calculated master period and slave period with respect to a subsequent superframe, and when there is a change in the number of stations, periods are set and the number of stations is checked by returning to operation S110.

When it is determined in operation S130 that the verification period is not equal to the superframe period, a process of increasing the superframe period by a minimum unit size (e.g., 1 ms) and restarting the calculation processing logic from the beginning is performed repeatedly until the verification period becomes equal to the superframe period. The embodiment of FIG. 12 illustrates a case in which the superframe period is 21 ms, which is 1 ms greater than the default value of 20 ms, i.e., a case in which the size of the superframe is increased according to a result of the determination in operation S130.

In another embodiment, a master period and a slave period may be determined by setting the master period using a modulo operation shown in Equations 5 to 8 below.

allocation period=superframe period−(beacon period+contention period)     [Equation 5]

if (allocation period mod slave count≠0)

then master period=allocation period mod slave count+α     [Equation 6]

else master period=minimum unit (e.g., 1 ms)+α+ ((allocation period−minimum unit)mod slave count)     [Equation 6]

slave period=(allocation period−master period)/slave count     [Equation 7]

In another embodiment, the master may receive information about the amount of data to be transmitted from each slave in the contention period, and set allocation periods to be allocated in proportion to the amount of transmission data, based on the received information.

According to the present disclosure, it is possible to perform MAC layer wireless transmission optimized for the UDP. That is, when a network layer using the UDP is applied to an upper MAC layer using a synchronous wireless scheduling transmission method, a transmitter is capable of efficiently transmitting a large amount of data (e.g., video stream data) to a receiving side in one direction.

While the configurations of the present disclosure have been described above in detail with reference to the accompanying drawings, the configurations are merely exemplary and various modifications and changes may be made therein within the scope of the present disclosure by those of ordinary skill in the technical field to which the present disclosure pertains. Therefore, the scope of the present disclosure is not limited to the aforementioned embodiments and should be defined by the following claims.

What is claimed is:

1. A wireless transmission scheduling method that is a synchronous media access control (MAC) wireless transmission scheduling method optimized for a user datagram protocol (UDP) of a personal wireless network-based data transmission system, the method comprising:
    setting, by a master station in a network, a superframe period, a beacon period, and a contention period;
    calculating, by the master station, one or more slave transmission periods of one or more slave stations participating in the network and a master transmission period of the master station, wherein the master transmission period is shorter than any of the one or more slave transmission periods;
    transmitting information regarding the slave transmission periods of the one or more slave stations to the one or more slave stations participating in the network;
    transmitting, by the one or more slave stations, one or more data packets to the master station in the slave transmission periods using a user datagram protocol (UDP), without including an acknowledgement request to the master station, wherein the master station does not send an acknowledgement to the one or more slave stations after receiving any of the one or more data packets; and
    transmitting, by the master station, a packet to the one or more slave stations in the master transmission period immediately following all of the one or more slave transmission periods and after receiving all of the one or more data packets from the one or more slave stations,
    wherein each of the slave transmission periods is 16 ms and the master transmission period is 1 ms, in response to the superframe period being 20 ms, a sum of the beacon period and the contention period being 3 ms, and there being one master station and one slave station in the network.

2. The method of claim 1, further comprising:
    calculating a verification period;
    determining whether the verification period is equal to a sum of the beacon period, the contention period, and the slave and master transmission periods; and
    wherein transmitting the one or more data packets by the one or more slave stations in the slave transmission periods is performed in response to the verification period being equal to the sum, and
    wherein the method further comprises calculating transmission periods of the one or more slave stations and the master station with respect to a subsequent superframe in response to the verification period not being equal to the sum.

3. The method of claim 1, wherein calculating the slave and master transmission periods comprises:
    checking a number of the one or more slave stations; and
    calculating transmission periods of the one or more slave stations and the master station based on the number of the one or more slave stations.

4. The method of claim 1, wherein the slave and master transmission periods are calculated by the following equation:

allocation period=superframe period−(beacon period+contention period);

master period=minimum unit size+α; and slave period=(allocation period−master period)/slave count.

5. The method of claim 1, wherein the master station is a single master station in the network and is configured to manage an entirety of the network.

6. The method of claim 1, wherein the one or more slave stations comprise a plurality of slave stations that consecutively transmit a plurality of data packets to the master station at an equal interval.

7. A wireless transmission scheduling method that is a synchronous media access control (MAC) wireless transmission scheduling method optimized for a user datagram protocol (UDP) of a personal wireless network-based data transmission system, the method comprising:
    setting, by a master station in a network, a superframe period, a beacon period, and a contention period;
    calculating, by the master station, one or more slave transmission periods of one or more slave stations participating in the network and a master transmission period of the master station, wherein the master transmission period is shorter than any of the one or more slave transmission periods;

transmitting information regarding the slave transmission periods of the one or more slave stations to the one or more slave stations participating in the network;

transmitting, by the one or more slave stations, one or more data packets to the master station in the slave transmission periods using a user datagram protocol (UDP), without including an acknowledgement request to the master station, wherein the master station does not send an acknowledgement to the one or more slave stations after receiving any of the one or more data packets; and transmitting, by the master station, a packet to the one or more slave stations in the master transmission period immediately following all of the one or more slave transmission periods and after receiving all of the one or more data packets from the one or more slave stations, wherein each of the slave transmission periods is 8 ms and the master transmission period is 1 ms, in response to the superframe period being 20 ms, a sum of the beacon period and the contention period being 3 ms, and there being one master station and two slave stations in the network.

8. A wireless transmission scheduling method that is a synchronous media access control (MAC) wireless transmission scheduling method optimized for a user datagram protocol (UDP) of a personal wireless network-based data transmission system, the method comprising:

setting, by a master station in a network, a superframe period, a beacon period, and a contention period;

calculating, by the master station, one or more slave transmission periods of one or more slave stations participating in the network and a master transmission period of the master station, wherein the master transmission period is shorter than any of the one or more slave transmission periods;

transmitting information regarding the slave transmission periods of the one or more slave stations to the one or more slave stations participating in the network;

transmitting, by the one or more slave stations, one or more data packets to the master station in the slave transmission periods using a user datagram protocol (UDP), without including an acknowledgement request to the master station, wherein the master station does not send an acknowledgement to the one or more slave stations after receiving any of the one or more data packets; and transmitting, by the master station, a packet to the one or more slave stations in the master transmission period immediately following all of the one or more slave transmission periods and after receiving all of the one or more data packets from the one or more slave stations, wherein each of the slave transmission periods is 4 ms and the master transmission period is 2 ms, in response to the superframe period being 20 ms, a sum of the beacon period and the contention period being 3 ms, and there being one master station and four slave stations in the network.

* * * * *